United States Patent [19]

Fournier et al.

[11] 3,986,856

[45] Oct. 19, 1976

[54] BLOWING APPARATUS HAVING INDIVIDUAL CONTROL OF NOZZLES

[75] Inventors: Yves Fournier, Chalon-sur-Saone; Jacques Fremaux, Bougival, both of France

[73] Assignee: Saint-Gobain Industries, Neuilly-sur-Seine, France

[22] Filed: Nov. 17, 1975

[21] Appl. No.: 632,846

[30] Foreign Application Priority Data

Nov. 18, 1974  France ............................ 74.37880

[52] U.S. Cl. .................................. 65/114; 65/348; 137/14; 137/83; 137/805; 239/533
[51] Int. Cl.² ........................................ C03B 27/00
[58] Field of Search ............ 65/114, 348, 349, 350, 65/351; 137/14, 83, 805, 835, 842; 239/518, 533, 544

[56] References Cited
UNITED STATES PATENTS

| | | | |
|---|---|---|---|
| 3,389,679 | 6/1968 | Weber et al. ................... | 137/805 X |
| 3,677,276 | 7/1972 | Kopera ............................ | 137/83 X |
| 3,721,256 | 3/1973 | Barnard ........................... | 137/805 |
| 3,877,485 | 4/1975 | Wojcikowski .................... | 137/83 X |

*Primary Examiner*—Arthur D. Kellogg
*Attorney, Agent, or Firm*—Pennie & Edmonds

[57] ABSTRACT

A laminated stack has grooves on the faces of the laminations forming fluid amplifiers and control channels therefor. Pneumatic detectors are coupled with the control channels. The laminations are perpendicular to the path of travel of workpieces to be treated, such as glass sheets, and outlet nozzles of the fluid amplifiers and openings of the pneumatic detectors face the glass sheet. Preferably opposed stacks on each side of the path of travel each emit detector jets to jet receivers of the other stack, and the nozzles thereof simultaneously treat both sides of the workpiece. The laminations may be oblique to the path of travel. Upstream and downstream detectors and combinations thereof are disclosed, including an Exclusive OR arrangement.

23 Claims, 7 Drawing Figures

BLOWING APPARATUS HAVING INDIVIDUAL CONTROL OF NOZZLES

The present invention pertains to a method of and apparatus for gaseous treatment in the glass industry, for example, for purposes such as forming, tempering and chilling glass objects, particularly glass sheets.

It has been proposed heretofore to pass sheets of glass (optionally heated to the vicinity of 630° C) between blowing chests which are provided with air nozzles so as to temper the glass by suddenly chilling it. It is also known to form glass objects by passing a parison between forming devices which include pneumatic generators and blowing nozzles whose function is to produce gaseous cushions in dynamic equilibrium so as to impose progressively the desired shape on the parison. The blowing devices may be associated with temperature controlling devices.

Commonly, in such apparatus, the nozzles deliver air continuously whether or not a workpiece is in position to utilize the flow therefrom. This has the undesirable effect of disturbing the temperature levels of the furnace or temperature controlling devices. Attempts to avoid these disadvantages by delivering air selectively to separate nozzles or groups thereof as a function of the position and/or shape of the workpiece have been complicated and expensive.

The apparatus of the invention makes it possible to interrupt the delivery of air when there is no workpiece in position, by switching the flow among the nozzles in such a way as to deliver air from closed nozzles to the outside of the apparatus, and optionally to recycle it when the gas is hot or toxic or otherwise of high value. The switching re-establishes the flow when the workpiece is presented, and the switching can be carried out in selected fashion as a function of various possible conditions for the shape and position of the workpiece.

In accordance with the invention the blowing devices past which, or between which, the workpieces travel comprise stacks of plates which have been provided with slots or grooves. These slots define fluid amplifiers which are fed with gas under pressure. Each amplifier comprises a supply nozzle channel and an escape or exhaust channel, the two of which constitute the principle outlets for the gas used in the treatment. Each further comprises at least one control channel which couples the two previously cited channels to a source of control signals for control purposes. The nozzle outlets are disposed along one edge of the stack.

Advantageously the control means takes the form of a fluid flow apparatus utilizing pneumatic detectors responsive to the passage of a workpiece. The control means is integrated into the stack of plates and the amplifiers possess monostable properties. Hence control of the nozzles does not involve any mechanically movable elements.

The workpiece can be advanced by any suitable carriage or transport means past the nozzle openings, and a plurality of stacks with a plurality of nozzles arranged in either the same or different configuration can be employed successively along the path of travel of the workpiece.

Each of the nozzle sets formed by a stack of sheets or laminations may be defined by a plurality of grooves or slots cut into the face of one sheet, or cut all the way through the sheet and covered by uncut sheets to form flow channels. A plurality of such devices can be interconnected with a control device associated with the respective stack. The control means itself is preferably formed by flow channels in one of the laminations of the stack.

In a preferred embodiment of the invention the control means is arranged to form part of the pneumatic detector, namely, the receiver portion of the detector. Two stacks of fluid amplifiers and control means are mounted on opposite sides of the path of travel of the workpiece, one controlling the other. Each pneumatic detector includes a receiver channel formed in one stack opposite a delivery or jet emitter channel of the other stack. The separation of the surfaces of the two stacks can be as great as several centimeters, so that the thickest glass sheets can be handled, and a symmetrical treatment of both sides of the sheet can be effected.

It is also possible to arrange the receiver channel which serves as the control channel in parallel rather than in series with the detector jet channel, the presence of the gas in the detector channel varying when a workpiece appears in front of the outlet orifice and close thereto. This makes it possible to operate on a single face of the workpiece, but has the disadvantage that the detector orifice must be close to the workpiece, say a few millimeters.

With the flow of air from the nozzles controlled by the presence of the workpiece itself, individual control of the nozzles or control thereof in groups makes it possible to adjust the treatment zone as a function of the shape of the workpiece.

The pneumatic detectors are spaced from the nozzles of the fluid amplifiers with respect to the path of travel of the glass sheets passing thereby. Accordingly there is a space between the point of detection of a glass sheet and the point of actuation of the corresponding nozzle. In some cases this spacing can be regarded as negligible since there is some spread in the gas streams from the nozzles, and the detectors can function within and inside a substantial transverse air current so that a relatively close spacing is possible. Moreover, if the direction of the spacing is suitably chosen, the spacing may serve in some degree to compensate for the delay in response of the fluid amplifier to a detected signal. Further, an intentional displacement between the detectors and their associzted nozzles makes it possible to achieve various differential effects in the operation of the nozzles at the edges or limits of the workpiece. In the latter case it has been found particularly advantageous, when operating with more or less rectangular glass sheets, to construct the stacks with their laminations oblique to the direction of travel of the glass sheets, so that the detectors are diagonally spaced from the corresponding nozzles, for example, at an angle of approximately 45°.

A combination of laminations differing by their shape or arrangement makes it further possible to combine the effects obtained so as to produce differential effects on the glass sheet being treated. This is particularly true when pneumatic detectors are employed in which jet emitters and jet receivers are on opposite sides of the path of travel of the workpieces, such as glass sheets. Also, by using successive pairs of stacks with respective upstream and downstream detector arrangements, it is possible to treat the glass sheets in a complementary manner.

In certain embodiments the control channel may constitute the outlet from a system of logic, pneumatic in nature, which may be controlled by a combination of two detectors and associated channels. In one embodiment which makes it possible to obtain selective treatment of different areas of a glass sheet, the sets of nozzles are connected to so-called Exclusive OR circuits comprising upstream and downstream pneumatic detectors with intersecting receiver channels which actuate the nozzles to one state when one or the other detector is actuated, and to the opposite state when both are actuated.

The invention will now be further described in connection with a number of presently preferred exemplary embodiments, with reference to the accompanying drawings in which.

DESCRIPTION OF THE PREFERRED EMBODIMENTS

Figure 1:
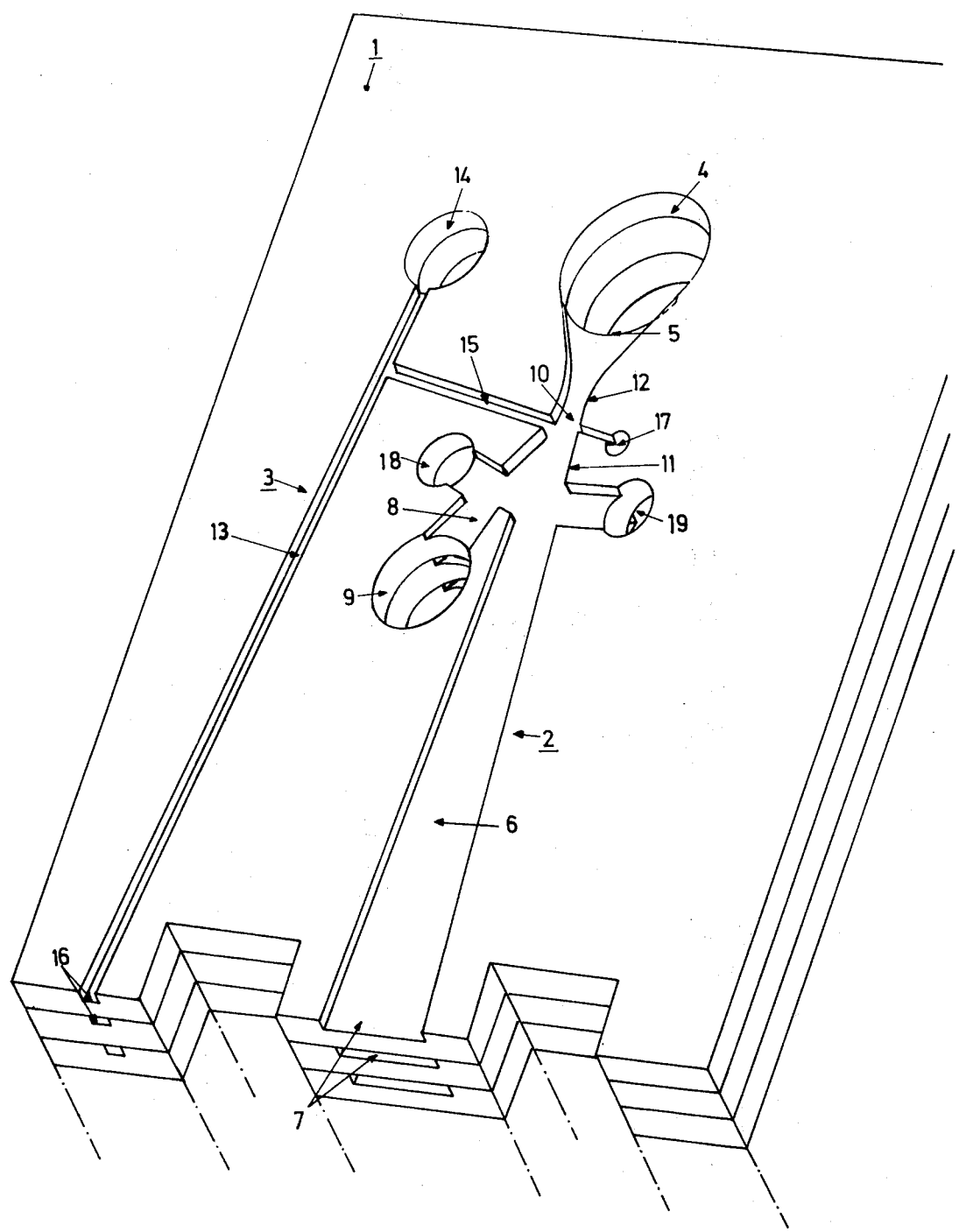
FIG. 1 is a perspective view of a laminated blowing stack containing fluid amplifiers and detector and control channels therefor.

FIG. 1 shows the structure of a laminated stack, with the top plate removed. The lamination 1 has formed therein an air blowing or pneumatic flow path generally indicated at 2 with a proximity detector 3 associated therewith. Each lamination is formed with various openings, and with grooves or channels which may be of constant depth and variable width. In the case illustrated, the channels are formed in a single surface of the lamination. The network of flow paths or channels may be formed in any suitable way, as by machining, cutting, molding or casting. The plates may under suitable circumstances be of plastic. The plates may, for example, be rectangular in shape and have a thickness of the order of 5 millimeters, and the grooves or channels formed therein may have a depth of the order of 2 millimeters.

As will be understood, with the laminations placed next to each other, or separated by suitable spacing laminations, a series of conduits are formed which are of rectangular cross-section and extend parallel to the faces of the laminations. Orifices at the ends of the channels in the laminations register with each other to form supply, exhaust or interconnection ducts which are perpendicular to the faces of the laminations, or oblique thereto if the laminations are staggered or displaced with respect to each other. These ducts may be open at the ends or limits of the stacks, or they may open to the atmosphere through ducts (not shown) which are parallel to the surfaces if the laminations, or may connected to wind chests if desired. The laminations may be bolted together or otherwise affixed to each other to provide tight seals between them.

The channels shown in lamination 1 form a fluid amplifier of known type. It is fed with gas under pressure via a supply tube connected with opening 4, and with corresponding openings in adjacent laminations. The fluid amplifier has a Y-shaped configuration with a convergent throat 5 and two divergent branches. One branch 6 opens at one of the edges of the laminations at a rectangular opening 7 and constitutes a blowing nozzle. The other branch 8 opens to an exhaust or relief duct formed by the successive piercings. They Y-shaped configuration forms a Venturi constriction at 10, and the external wall 11 of the branch 6 is slightly offset with reference to the boundary surface 12 of the throat portion 5 so that the flow in this branch is unstable. On the other hand, the gas supplied from duct 4 has a tendency to follow the external wall of branch 8 and hence, in the absence of a control jet, flows in that direction.

The control means for the fluid amplifier includes a detector channel 13 fed from a supply duct 14, with a control conduit 15 coupling channel 13 to the fluid amplifier at region 10. The detector conduit 13 opens via a mouth 16 of small cross-section on the same edge of the lamination as the nozzle 7.

Under these conditions, and so long as there is no obstruction opposite the opening 16, the gas delivered from duct 14 escapes freely. On the other hand, when a workpiece to be treated is disposed in front of orifice 16, the flow of gas from duct 14 will be diverted toward the control conduit 15 sufficiently to shift the gas flow in the fluid amplifier to branch 6. Accordingly gas will be emitted from orifice 7. Conversely, as soon as the workpiece moves past opening 16, gas flow will resume in conduit 13 and the control action of conduit 15 will cease so that the principal flow of gas in the fluid amplifier will again be in the direction of branch 8 to the exhaust duct 9.

FIG. 1 further shows three holes 17, 18 and 19 connected by narrow conduits to the principal channels. These are relief passages intended to stabilize the flow of gas and to reduce the switching times of the amplifier, in accordance with known principles. It is not necessary to give further design details since they correspond to the known state of the art with respect to hydraulic flow in wall-attached fluid amplifiers.

The combination of channels in the laminations thus constitutes a monostable logical amplifier coupled to a pneumatic detector and controlling a blowing nozzle in response to a "no air" or an "air" condition, enabling flow of air from nozzle 7 in the presence of an object in front of the detector opening 16.

It is possible in an analogous manner to construct pneumatic circuits of different configurations or appearance. In particular it is possible to combine together into one circuit complementary plates disposed together or separated by spacers and therewith to control one or more blowing nozzles with the help of a single control circuit. It is also possible to produce successive stacks having different modes of operation, and to associate plural circuits in a single stack, and even to feed them from separate fluid sources.

Figure 2:
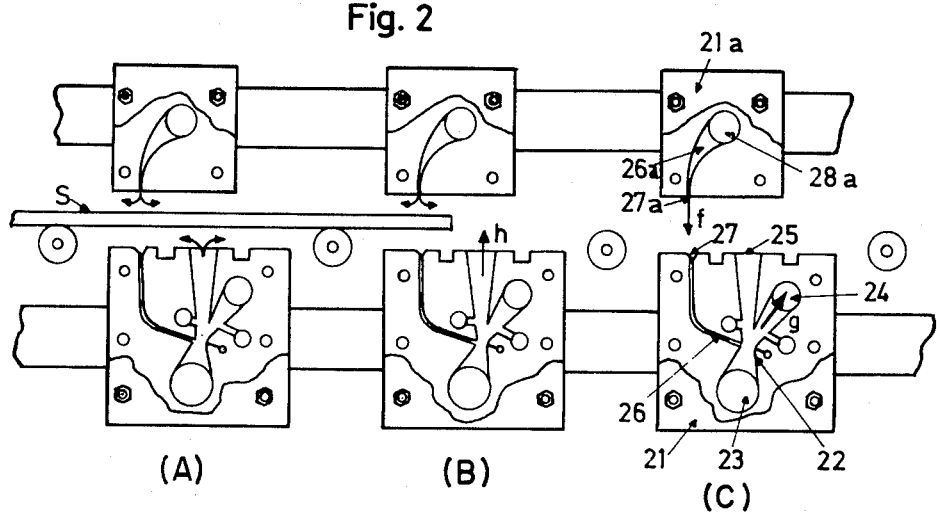
FIG. 2 shows a plurality of stacks operating on the lower surface of a glass sheet and using opposed jets for detection.

FIG. 2 shows schematically a longitudinal elevation of apparatus utilizing pneumatic detectors in which an emitter and a receiver are positioned in alignment on opposite sides of a glass sheet S to be treated. Such an arrangement is suitable for the treatment of the lower surface of the glass sheet. The apparatus may comprise a plurality of stacks 21, each of which has a complementary stack 21a.

The stacks 21 include laminations having mono-stable fluid amplifiers formed therein similar to that of FIG. 1, and only the essential elements of one lamination of each stack are shown in FIG. 2. These include the centrally disposed amplifier 22 fed by duct 23 and formed in a Y-shaped configuration similar to that already described. However, in FIG. 2, the fluid amplifier is designed so that the unstable branch connects with the exhaust duct 24. The gas from duct 23 therefore flows in the direction of the blowing nozzle 25, in the absence of a control jet.

The fluid amplifiers are controlled by means of respective receiver channels 26. This connects with the fluid amplifier on the side of the stable branch, and opens at its opposite end at an orifice 27 disposed on the blowing edge of the stack 24. The receiver channel 26 is positioned in alignment with an emitter channel 26a formed in a corresponding lamination of the stack 21a. The channel 26a is fed with gas under pressure from duct 28a and opens via a narrow orifice 27a at the lower face of the stack opposite orifice 27. Orifice 27 may be funnel-shaped to improve the sensitivity of the detector.

At C of FIG. 2 the glass sheet S has not yet reached the stacks 21 and 21a. Consequently the receiver channel 26 is fed as indicated by the arrow $f$ and controls the fluid amplifier so that the gas supplied to the amplifier from duct 23 is directed to the exhaust duct 9 as indicated by arrow $g$.

At B of FIG. 2, the glass sheet S supported on a suitable transport mechanism between the two complementary stacks, cuts off the detector jet. Consequently the receiver conduit 26 no longer receives a supply of gas and the principal jet from the duct 23 leaves the unstable branch so as to be directed towards the blow nozzle 7 as indicated by the arrow $h$. Inasmuch as the glass sheet S has not yet reached the nozzle, gas from the nozzle does not yet impinge thereon.

At A in FIG. 2, the glass sheet is opposite the nozzle, and also is in position to interrupt the detector jet. Accordingly the glass sheet is undergoing treatment, as indicated by double arrows from the nozzle.

The overall operation of the stacks in FIG. 2 in response to a glass sheet is similar to that of FIG. 1, but the pneumatic detector arrangement of FIG. 2 is preferred. Although the thickness of the sheet undergoing treatment may not exceed the separation of the two stacks 21, 21a, i.e. the effective range of the detector, this separation may amount to several centimeters. As distinguished from FIG. 1, good operation does not depend upon the distance separating the orifice of the detector emitter channel from the corresponding face of the sheet.

Figure 3:
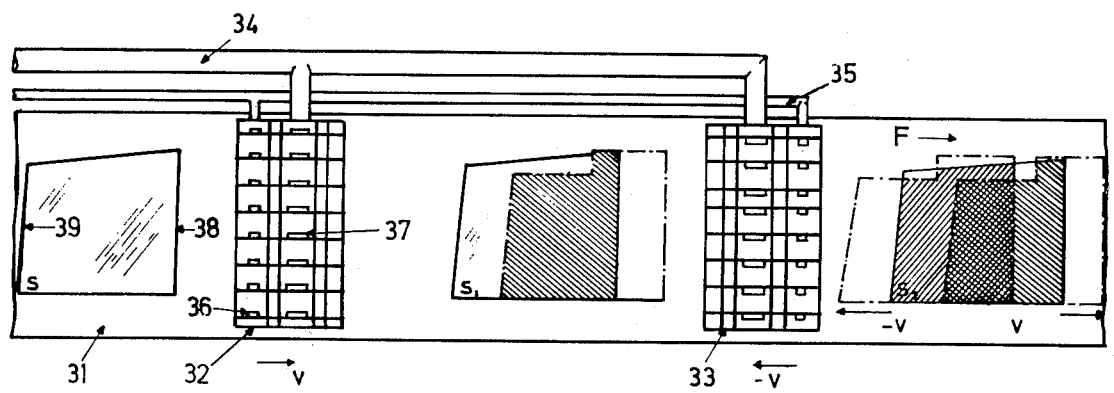
FIG. 3 is a schematic representation of the operation effected by a plurality of blowing stacks spaced along the path of travel of a glass sheet.

FIG. 3 shows a schematic representation of successive treatment stacks spaced along the path of travel of glass sheet S. The figure shows with much exaggeration the influence of the shape and size of the sheet and the displacement undergone during the successive treatments.

A sheet S is conveyed by suitable means along a planar path of travel indicated by lines 31 in the direction of arrow F. It passes by two successive stacks 32 and 33 having fluid amplifiers supplied with gas through pipe 34 and connected to an exhaust pipe 35. Each stack is composed of laminations extending longitudinally of the path of travel of sheets S, and oriented perpendicularly to the plane of the path of travel.

In stack 32 the detector apertures 32 are upstream of nozzles 37. Accordingly the nozzles are enabled as soon as the leading edge 38 of one of the sheets S reaches the line of detectors 36. To the extent that one neglects the small switching delay in the control of the fluid amplifiers, and the fact that the gaseous jets operate over surfaces of the glass sheet larger than the cross-section of the nozzles themselves, it will be understood that the blowing begins somewhat ahead of the sheet (as in B of FIG. 2) and is thus displaced with reference to the sheet by a distance represented by the vector V. The displacement is also shown by the dot-dash line in the middle of FIG. 3. Similarly, the blowing ceases as soon as the trailing edge 39 passes the line of detectors 36. The consequence is that as sheet S passes by the stack 32, the zone effectively treated corresponds approximately to the hatched area $S_1$.

When non-uniformity of treatment cannot be neglected, it is possible to compensate for it, at least in part, by the operation of the second stack 33. As shown, the positions of the nozzles and detectors in stack 33 are reversed from their positions in stack 32. That is, in stack 33 the detectors 36' are downstream of nozzles 37 corresponding to a displacement shown by vector $-V$. Thus the nozzles are enabled after the leading edge 38 has passed thereby, and continue enabled for a short time after the trailing edge 39 has passed thereby. Thus the zone effectively treated corresponds approximately to the hatched area $S_2$. Areas $S_1$ and $S_2$ overlap as indicated by the cross-hatched area. Accordingly substantially the whole area of the glass sheet has been treated. It will be recognized that there remains at least theoretically an edge effect, but it is smaller and better distributed.

It is possible in certain cases to replace the longitudinal displacement by a lateral displacement, forming new nozzle assemblies with the help of nozzle-containing laminations disposed longitudinally, and additionally by means of control laminations placed between the previous ones and having detectors positioned at the same height along the path of travel of the glass sheets. It is however preferable to dispose the different laminations of each stack obliquely.

Figure 4:
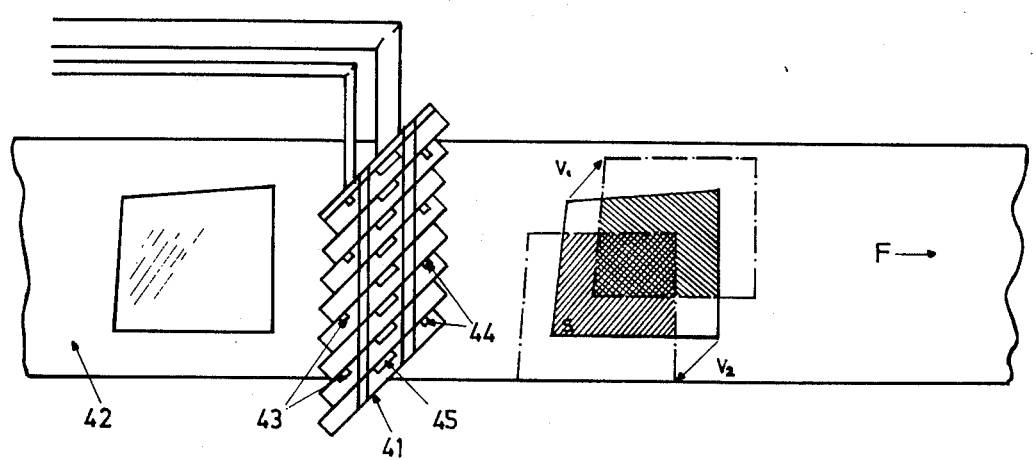
FIG. 4 is a schematic representation of the operation effected by blowing stacks having obliquely disposed laminations.

FIG. 4 shows a single stack 41 made up of complementary laminations disposed at 45° with respect to the path of travel 42 of the glass sheets. These laminations form a double set or battery of detectors 43 and 44 reversely positioned with respect to the blowing nozzles 45 in such manner that two complementary treatments occur superposed on each other with relative displacements indicated by the vectors $V_1$ and $V_2$.

It will be seen that the symmetry is further improved, the edge effect being shared or distributed in a substantially regular way over the circumference of the sheet S. In reality the small relative spacing of the different nozzles and the fact that their action spills over beyond the location of the nozzles themselves makes it possible to obtain a sufficiently homogeneous effect having only a more or less marked edge effect.

A similar result could be obtained with the help of laminations in which a single detector controls two nozzles disposed symmetrically on opposite sides thereof, and still further improved by the provision of a second stack disposed perpendicularly to the first.

It is to be noted in passing that in practice the marginal zones are much smaller than here represented, and this is why they can often be neglected. Similarly, the irregularities introduced by the spacing of the nozzles are relatively small.

Figure 5:
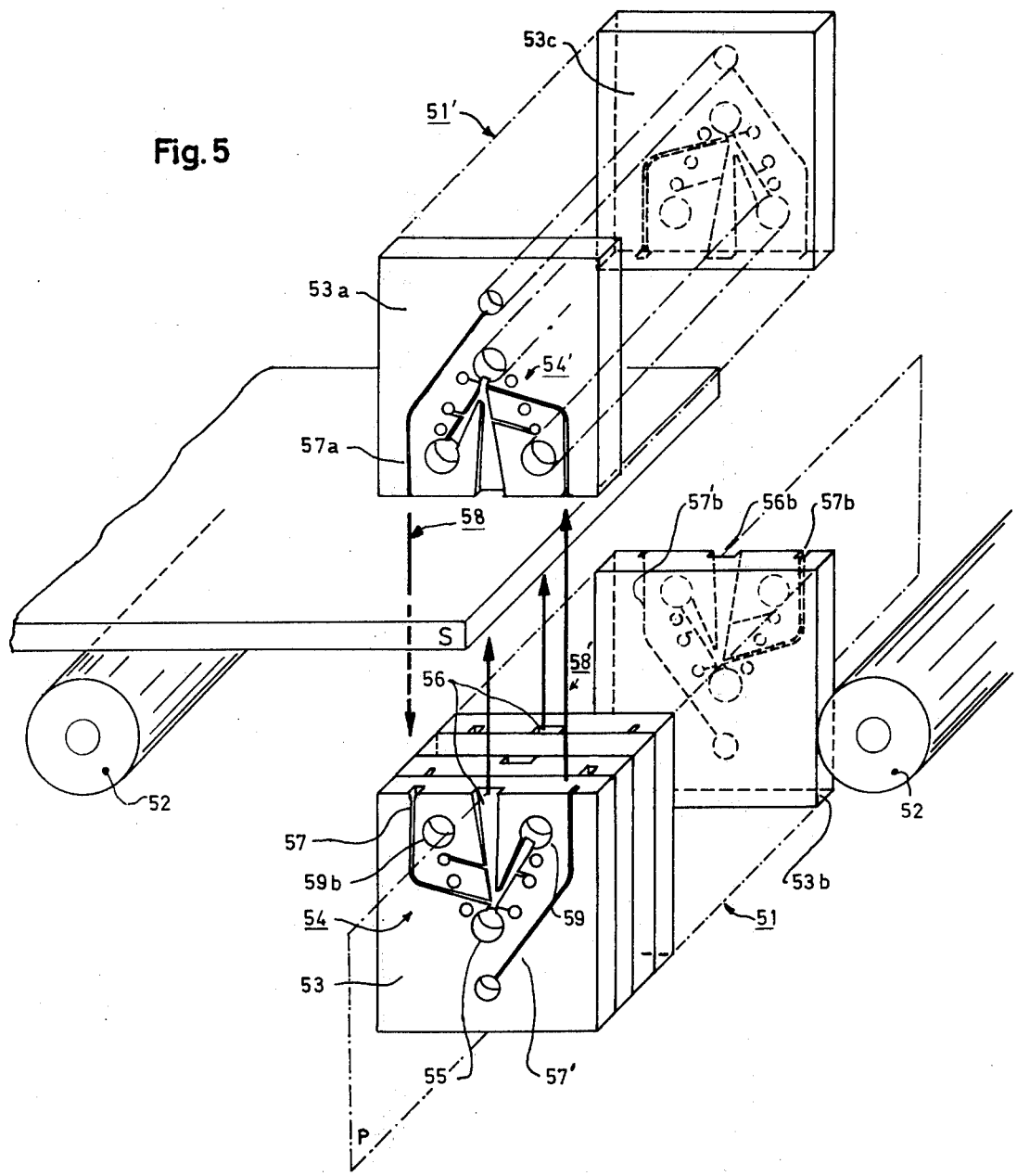
FIG. 5 is a perspective view of opposed sets of stacks for effecting symmetrical treatment of a glass sheet on the two faces thereof.

FIG. 5 is a perspective view of the various laminations of a battery comprising two stacks producing a symmetrical action on the two faces of a sheet of glass. The showing is schematic and the end plates are removed in order to show the internal construction.

The two stacks 51 and 51' between which the glass sheet S is transported by roller conveyor 52, are made up of laminations whose structure is similar to that shown in FIG. 2. The plate 53, for example, comprises a fluid amplifier 54 fed from a duct formed by openings 55 and normally supplying gas to the blowing nozzle 56. The receiver conduit 57 forming part of a detector 58 makes it possible to deviate the jet to the duct 59. The passage 57 is disposed in alignment with an emitter conduit 57a formed in plate 53a. The plate 53a also includes a fluid amplifier 54' identical to the amplifier 54, and the plate 53 includes the emitter conduit 57' of a detector 58' which is provided for control of amplifier 54'. Each of these plates hence bears two half circuits and thus combine the function of the laminations 21 and 21a of FIG. 2.

Preferably the laminations are identical but are reversed in assembly so that the detectors are alternately upstream and downstream of the corresponding nozzles. As will be understood, the blowing on the lower face of the workpiece by nozzles 56 begins as soon as the leading edge of the glass sheet passes over the openings of the detectors 58, whereas the operation on the upper face begins when the leading edge passes the detector 58'. Accordingly, the stack comprises in alternation laminations 53 and 53a and complementary laminations 53b and 53c whose configuration is preferably symmetrical in a transverse plane P through the blowing nozzles. Thus in both upper and lower stacks upstream detectors alternate with downstream detectors.

The laminations 53b, 53c are fed from the same ducts as the laminations 53 and 53a, but at least one part of the exhaust ducts must be separate. Therefore lamination 53, for example, is pierced with an opening 59b corresponding to the exhaust opening for the plate 53b. This opening is symmetrical with the opening 59. Likewise the openings of the detectors 58 and 58' are symmetrically positioned with respect to the median plane P. It will be observed that it is then possible to employ for each stack individual laminations which are all identical to each other, by reversing half of them. With such construction two channeled faces are toward each other, and they are separated by a spacer.

The construction of the blowing faces thus obtained is visible in the figure. This face comprises a plurality of rows of blowing nozzles 56 and 56b controlled by receiver conduits 57 and 57b whose openings are alternately upstream and downstream of the row of nozzles. The figure also shows the narrow openings of the emitter conduits 57' and 57b' disposed alternately with the receiver conduits 57 and 57b, the emitter conduits 57' and 57b' registered with corresponding receiver conduits of the upper stack. It can readily be seen that apart from a small lateral shift due to the successive reversal of the planes of the nozzles, the treatments effected by the lower stack 51 and the upper stack 51' are symmetrical.

These treatments can be accompanied by a certain amount of edge effect. It is possible to achieve a selected action either at the center of each glass sheet to reinforce the edge effect, or on the contrary to make this selective action operative on the edges so as to eliminate the edge effect or even to emphasize it. In the first place the blowing nozzles can be controlled by a combination of two detectors by the interposition of a logical AND circuit. In the second case there can be employed an Exclusive OR logical circuit. This latter procedure is advantageous in the case of thermal tempering of glass sheets and devices employing this principle will be described with reference to FIGS. 6 and 7.

Figure 6:
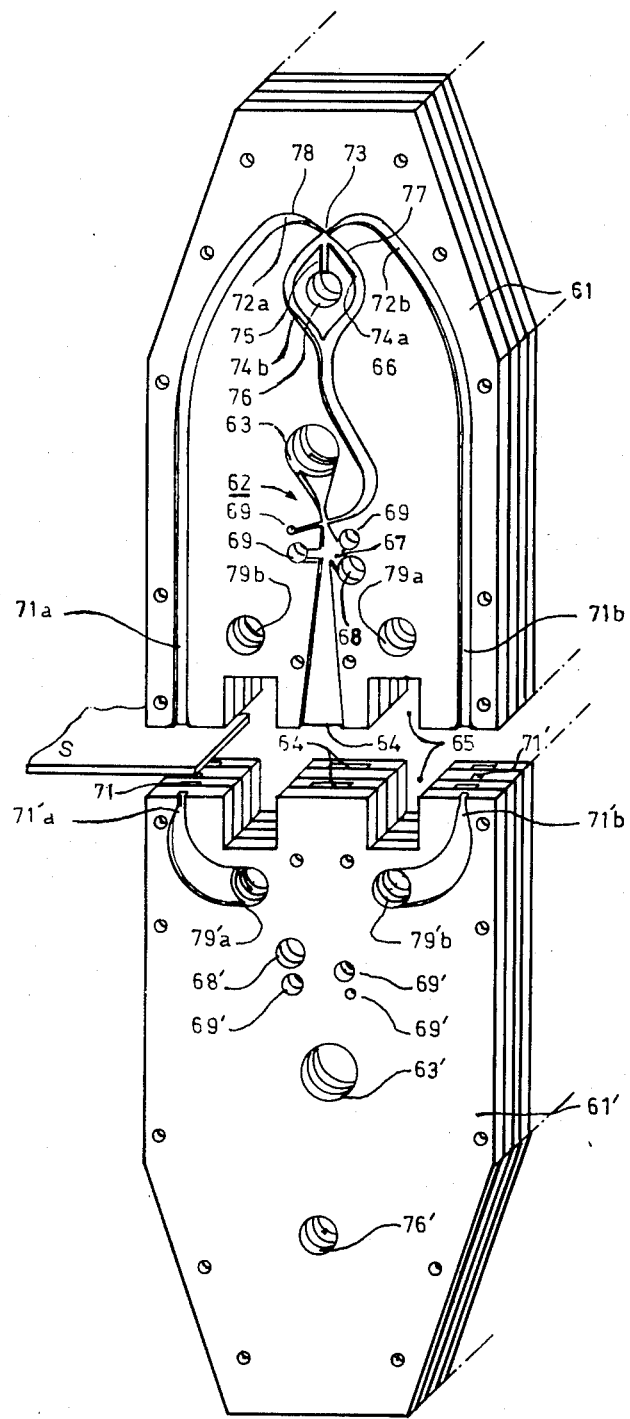
FIG. 6 is a perspective view of modified opposed sets of stacks operating on the leading and trailing edges of a glass sheet.

Referring to FIG. 6 these devices comprise at least one battery of two stacks disposed on opposite sides of the path of travel of the glass sheet S. The first channeled lamination of each of the two stacks is shown in detail, the outermost lamination having been removed so as to illustrate the interior construction.

The two stacks are identical and their blowing faces are symmetrically positioned, apart from a small shift or displacement corresponding to the thickness of the lamination. Each vertical section comprises two complementary laminations, namely, a nozzle lamination 61 and a detector emitter lamination 61'. The nozzle lamination 61 again includes a monostable fluid amplifier 62 fed with air from a duct 63. Flow of air from the mouth of the nozzle 64 is facilitated by grooves 65. A control conduit 66 opens at the junction of the Y-shaped channel at the side of branch 67 which is the stable branch, and in the absence of a control signal the gaseous flow is toward the exhaust conduit 68. Various channels and apertures are provided as usual for equilibrium and stabilization, such as that indicated at 69. The conduit 66 constitutes the output of a pneumatic logic circuit, of known type per se.

The logic circuit is formed by the intersection of two detector receiver conduits 71a and 71b, via convergent portions 72a and 72b, at point 73 where they cross at 90°. They then continue in two divergent portions 74a and 74b prior to coming together at the input of the control conduit 66. An exhaust or overflow conduit 75 connected to the exhaust duct 76 is disposed at the junction point 73 along the bisector of the angle formed by the two divergent portions 74a and 74b. As seen in the figure, the external wall 77 of each of these divergent portions is disposed as a continuation of the corresponding wall 78 of the convergent portion whereas a notch appears in each opposite wall.

The receiver conduits 71a and 71b open opposite the orifices of the two detector emitter conduits 71' and 71b' fed from ducts 79a and 79b and symmetrically disposed in the control lamination 61'.

In the next vertical section the arrangement is reversed, the two laminations corresponding to 61 and 61' being interchanged. Thus the laminations are shown assembled in alternation in the two stacks. This is the reason why, for example, the laminations 61 and 61' are provided with various openings 65', 68', 69', 76', 79a and 79b which insure continuity through the stack of the various supply and exhaust paths.

A series or plurality of blowing nozzles 64, a double alternation of detector receiver openings 71 associated with blowing nozzles of the lower stack, and detector emitter openings 71' registering with corresponding receiver openings of the upper stack, can be seen on the blowing face of the lower stack. The blowing face of the upper stack is similarly arranged.

The operation of the system is as follows:

In the presence of a glass sheet in front of both of the detector receiver conduits 71a and 71b there will of course be no flow of gaseous medium through those conduits and hence none in the control conduit 66. Therefore the principal air jet from the fluid amplifier 62 will be directed toward the stable branch and hence to the exhaust duct 68.

In the absence of a glass sheet between the detector emitter openings and the receiver openings, gas will flow from the conduits 71a' and 71b' into the conduits 71a and 71b. At the junction point 73 these two flow currents mutually change their directions of flow so as to combine in a single gas flow which passes through the exhaust conduit 75 and escapes via the duct 76. It will hence be seen that in this case again the conduit 66 is not supplied so that the blowing nozzle 64 remains cut off and does not deliver.

On the other hand, when a glass sheet is disposed in front of only one of the detector conduits, 71a for example, the second detector conduit 71b alone will continue to receive an air jet, and under these conditions the jet emerging from the convergent portions 72b will not be deflected but will pass through the conduit divergent portion 74b to reach the conduit 66 and cause the principal jet to reverse, in flip-flop fashion, toward the blowing nozzle 64 which thereupon begins to deliver. This operation occurs each time one of the edges of the sheet of glass being treated passes by the detector openings of the two conduits 71a and 71b.

The logic table for the two outlets 66 and 76, as a function of two detection operations A and B is as follows:

|   | A | $\bar{A}$ |
|---|---|---|
| B | 76 | 66 |
| $\bar{B}$ | 66 | $\phi$ |

It can be seen from this table that the outlet 76 responds to the logical function AND whereas the outlet 66 responds to the logical function Exclusive OR.

Accordingly, during the time the leading edge of the glass sheet passes from 71a to 71b, the nozzle 64 will be enabled and an area adjacent the leading edge will be subjected to gas treatment. Similarly, as the trailing edge passes from 71a to 71b, an area adjacent the trailing edge will be treated. Between these two areas gas treatment will be cut off.

Figure 7:
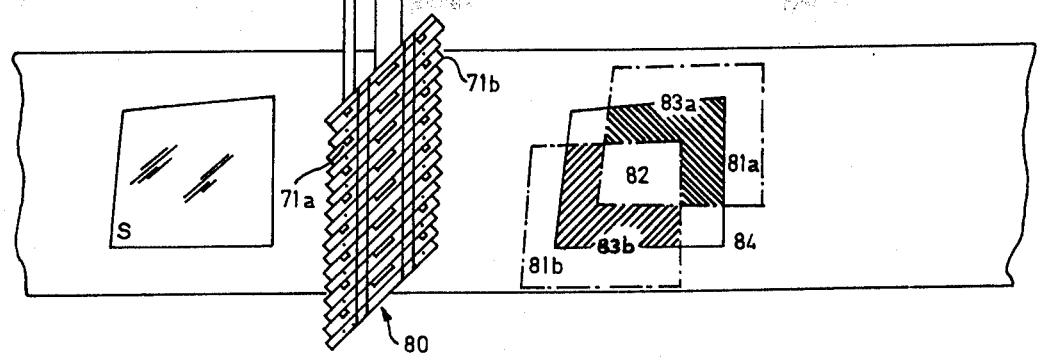
FIG. 7 is a diagrammatic representation showing the operation of stacks similar to FIG. 6 but with obliquely oriented laminations.

FIG. 7 shows a glass sheet S treated by a device 80 similar to that which has just been described but in which the laminations are oblique. The zone to which the detectors 71a respond is shown by the dot-dash area 81a, regard being had for the diagonal spacing between these detectors and the corresponding blowing nozzles. Similarly the zone corresponding to detectors 71b is shown by the dot-dash area 81b. The partial overlapping of these two zones identifies four regions, namely:

a. an internal region 82 within which the AND condition is fulfilled and no gas treatment occurs;
b. two intermediate regions 83a and 83b in which there is fulfilled the Exclusive OR condition and consequent gas treatment, these regions being adjacent the edges of the sheet; and
c. an external region corresponding to the logical condition Neither Nor where no gas treatment occurs.

As is evident the regions of the glass sheet subjected to the blowing are those which correspond to the Exclusive OR condition, namely the cross-hatched zones 83a and 83b. It will also be noted that the treatment obtained is complementary to that shown in FIG. 4, and may be used to reinforce treatment of the edges of the sheet. The connection of the control channel 66 of the amplifier to the conduit 75 would, on the other hand, make it possible to actuate the amplifier in response to the AND condition, and thus to reinforce or supplement blowing at the center of the sheet. The device 80 could moreover be supplemented with a stack of laminations of reversed inclination of obliquity.

A device has been utilized to effectuate tempering of the periphery of a glass workpiece 6 millimeters thick under the following conditions:

| Blowing: | |
|---|---|
| Distance between the blowing faces of the stacks | 25 mm. |
| Spacing of the nozzles | 15 mm. |
| Cross-section of the nozzles | 42 sq. mm. |
| Supply duct diameter | 40 mm. |
| Supply pressure | 150 millibars |
| Detection: | |
| Cross-section of the emitter orifices | 1 sq. mm. |
| Diameter of the supply ducts | 30 mm. |
| Supply pressure | 500 millibars |
| Exhaust | |
| Opening of 20 mm. - exhaust through the rear of the plates. | |

We claim:

1. Apparatus for the gaseous treatment of workpieces moving relatively thereto in a predetermined path of travel which comprises
    a. a laminated stack of fluid amplifiers mounted on one side of said path of travel with the laminations thereof oriented perpendicular to the plane of said path of travel,
    b. said laminated stack including a plurality of laminations with grooves in the faces thereof forming with adjacent laminations respective fluid amplifiers of the wall-attached type,
    c. said amplifiers each having supply and exhaust openings, a gas-emitting channel opening on the side of the stack facing said path of travel, and a control channel for enabling and cutting off gas flow in said gas-emitting channel,
    d. and pneumatic detector means coupled with the control channels of said amplifiers for detecting a workpiece and supplying corresponding control signals to the control channels.

2. Apparatus according to claim 1 in which said fluid amplifiers are monostable.

3. Apparatus according to claim 1 in which said control channels extend to said side of the stack facing said path of travel and form openings forming part of said pneumatic detector means.

4. Apparatus according to claim 3 in which the laminations of said stack are disposed obliquely with respect to said path of travel.

5. Apparatus according to claim 3 in which said pneumatic detector means includes a plurality of jet emitters on the opposite side of said path of travel, said jet emitters being in alignment with and directed toward said openings of the control channels whereby said openings form jet receivers.

6. Apparatus according to claim 5 in which said openings in the gas-emitting channels of the fluid amplifier are in alignment along the stack, and said openings of predetermined control channels are in alignment along the stack and spaced from the openings of the gas-emitting channels.

7. Apparatus according to claim 6 in which predetermined openings of the channels are respectively upstream and downstream of the gas-emitting openings of the fluid amplifiers in respective alignments which are symmetrical with respect to the alignment of the openings of the fluid amplifiers.

8. Apparatus in accordance with claim 6 in which a pair of stacks are spaced longitudinally of said path of travel, and openings of the control channels of said pair of stacks being respectively upstream and downstream of the openings of the gas-emitting channels thereof.

9. Apparatus according to claim 7 in which the laminations of said stack are disposed obliquely with respect to said path of travel.

10. Apparatus according to claim 1 in which said pneumatic detector means includes a pair of jet receivers in said stack and a corresponding pair of jet emitters on the opposite side of said path of travel in alignment with respective jet receivers, said jet receivers being connected to a said control channel for the joint control of a said fluid amplifier.

11. Apparatus according to claim 10 in which said jet receivers are connected to said control channel for producing an Exclusive OR operation of said fluid amplifier.

12. Apparatus for the gaseous treatment of glass sheets moving relatively thereto in a predetermined path of travel which comprises
    a. a pair of laminated stacks of fluid amplifiers mounted on opposite sides of the path of travel of said glass sheets with the laminations thereof oriented perpendicularly to the plane of the path of travel,
    b. each laminated stack including a plurality of laminations with grooves in thhe faces thereof forming with adjacent laminations respective fluid amplifiers of the wall-attached type,
    c. said amplifiers each having supply and exhaust openings, a gas-emitting channel opening on the side of the stack facing said path of travel to form a nozzle, and a control channel for enabling and cutting off gas flow to the nozzle,
    d. said nozzles of respective stacks being spaced laterally of said path of travel,
    e. and pneumatic detector means including jet emitter means associated with each of said stacks and jet receiver means associated with the other stack in alignment with the corresponding jet emitter means,
    f. said jet receiver means being connected with said control channels of the corresponding stack of fluid amplifiers.

13. Apparatus according to claim 12 in which said control channels of respective stacks of fluid amplifiers include openings facing the other stack to form receiver openings of said jet receiver means, and said jet emitter means of each stack includes a plurality of jet emitters facing and aligned with said receiver openings of the other stack.

14. Apparatus according to claim 13 in which said receiver openings are spaced from the nozzles of the corresponding fluid amplifiers with respect to the path of travel of the glass sheets passing thereby.

15. Apparatus according to claim 13 in which said receiver openings are diagonally spaced from the nozzles of the corresponding fluid amplifiers with respect to the path of travel of the glass sheets passing thereby.

16. Apparatus according to claim 14 in which said receiver openings are alternately spaced upstream and downstream of said nozzles with respect to the travel of glass sheets thereby.

17. Apparatus according to claim 15 in which said receiver openings are alternately spaced upstream and downstream of said nozzles with respect to the travel of glass sheets thereby.

18. Apparatus according to claim 12 in which said jet emitter means includes a pair of jet emitters and said jet receiver means includes a corresponding pair of jet receivers spaced respectively upstream and downstream of the nozzle controlled thereby, said pair of jet receivers being connected with the control channel of the nozzle for producing an Exdlusive OR operation of the nozzle.

19. A method of tempering sheets of glass which comprises
    a. passing a glass sheet along a path of travel between two opposed sets of fluid amplifiers,
    b. each set of fluid amplifiers including a plurality of gas-emitting nozzles spaced laterally of the path of travel of the glass sheet for directing gas streams toward the corresponding side of the glass sheet,
    c. each set of fluid amplifiers including control channels for enabling and cutting off gas flow to said nozzles and detector jet receivers connected with the control channels,
    d. and pneumatically detecting the presence of a glass sheet by detector jets directed across said path of travel to the jet receivers of each set of fluid amplifiers to thereby enable gas flow from said nozzles.

20. A method according to claim 19 for differentially tempering the glass sheet including positioning said detector jets and corresponding jet receivers upstream of said nozzles.

21. A method according to claim 19 for differentially tempering the glass sheet including positioning said detector jets and corresponding jet receivers downstream of said nozzles.

22. A method for tempering a glass sheet which comprises successively treating the glass sheet in accordance with claims 20 and 21.

23. A method according to claim 19 for differentially tempering the glass sheet including positioning said detector jets and corresponding jet receivers diagonally of the nozzles controlled thereby with respect to the path of travel of the glass sheet.

* * * * *